United States Patent [19]
Halliwell et al.

[11] Patent Number: 5,251,300
[45] Date of Patent: Oct. 5, 1993

[54] DATA PROCESSING NETWORK

[75] Inventors: Harry Halliwell, Winchester; David J. Vines, Romsey; Hugh W. Prior, Eastleigh, all of England

[73] Assignee: International Business Machines Corporation, Armonk, N.Y.

[21] Appl. No.: 671,839
[22] PCT Filed: Aug. 3, 1989
[86] PCT No.: PCT/GB89/00887
§ 371 Date: Apr. 2, 1991
§ 102(e) Date: Apr. 2, 1991
[87] PCT Pub. No.: WO91/02314
PCT Pub. Date: Feb. 21, 1991
[51] Int. Cl.⁵ .............................................. G06F 13/00
[52] U.S. Cl. ................................................... 395/200
[58] Field of Search ................. 364/DIG. 1, DIG. 2; 395/200; 370/94.1

[56] References Cited

U.S. PATENT DOCUMENTS 4,466,063 8/1984 Segarra et al. ...................... 395/200

FOREIGN PATENT DOCUMENTS 0201063 11/1986 European Pat. Off.
0325384 7/1989 European Pat. Off.
8903086 4/1989 PCT Int'l Appl.

OTHER PUBLICATIONS

"Method for Managing Client/Server Relationships in the AIX Operating System", IBM Technical Disclosure Bulletin, vol. 31, No. 8, Jan. 1989.

Primary Examiner—Robert L. Richardson
Attorney, Agent, or Firm—Wayne P. Bailey

[57] ABSTRACT

The invention provides a data processing network having a first processor, a second processor and a communication system linking said first processor and said second processor characterized in that when said first processor issues a call for triggering said second processor to allocate a real identifier for an entity, control logic associated with said first processor and responsive to said call from said first processor allocates a local identifier available for immediate use by said first processor and subsequently transforms between said local identifier and said real identifier. The invention both recognizes and solves the problem of a first processor being delayed while waiting for an identifier to be supplied by a second processor. Control logic associated with the first processor provides a local identifier for use by the first processor without having to wait for the real identifier from the second processor. This mode of operation presents the problem that the first and second processors are using different identifiers for the same entity and so the control logic must also transform between the real and local identifiers in order to maintain integrity between the processors. The control logic is typically provided in the form of software running on the first processor.

15 Claims, 1 Drawing Sheet

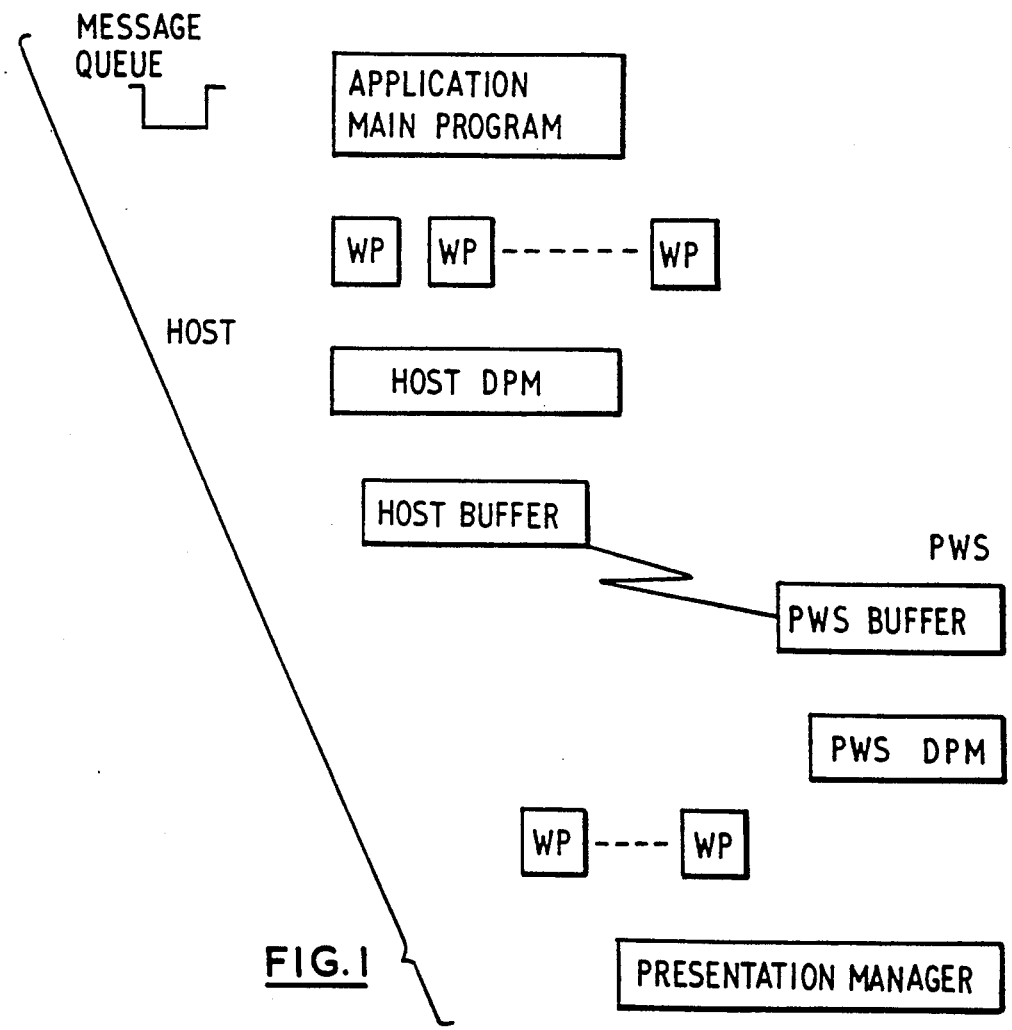

DATA PROCESSING NETWORK

This application is the national phase of international application PCT/GB89/00887, having an international filing date of Aug. 3, 1989.

TECHNICAL FIELD OF THE INVENTION

The invention relates to the field of data processing networks. More particularly the invention relates to data processing networks adapted to perform distributed processing.

BACKGROUND OF THE INVENTION

The use of data processing networks is becoming more widespread. Data processing networks have considerable advantages over isolated single processor systems. The processors within a data processing network are able to share resources such as storage, printers etc as well as sharing the processing load. A limiting factor in the efficiency of data processing networks are the delays introduced in transmitting information between processors within the data processing network.

SUMMARY OF THE INVENTION

One approach to reducing this limitation is to develop higher speed communication systems for linking the processors within data processing networks. Great strides forward have been made in this regard with the development of optical fibre based communication systems and the like.

The invention provides a data processing network having a first processor, a second processor and a communication system linking said first processor and said second processor characterised in that when said first processor issues a call for triggering said second processor to allocate a real identifier for an object or other type of entity, control logic associated with said first processor and responsive to said call from said first processor allocates a local identifier available for immediate use by said first processor and subsequently transforms between said local identifier and said real identifier.

The invention both recognises and solves the problem of a first processor being delayed whilst waiting for an identifier to be supplied by a second processor. Control logic associated with the first processor provides a local identifier for use by the first processor without having to wait for the real identifier from the second processor. This mode of operation presents the problem that the first and second processors are using different identifiers for the same entity and so the control logic must also transform between the real and local identifiers in order to maintain integrity between the processors. The control logic is typically provided in the form of software running on the first processor.

It will be appreciated that the entity or object for which an identifier is required may take many possible forms. Typical examples of the sort of entity/object possible are a window within a windowing display system or a block of storage or code. The identifier may be thought of as a label, tag or "handle" for the entity. The identifier may, for example, be a number, string or combination of numbers and strings. It will also be appreciated that invention applies equally well to networks having any number of processors.

Another preferred feature of the invention is that when said second processor issues a call for triggering said first processor to allocate a real identifier for an entity/object, control logic associated with said second processor and responsive to said call from said second processor allocates a local identifier available for immediate use by said second processor and subsequently transforms between said local identifier and said real identifier. By providing such control logic at each end of the communication system neither processor need wait for a real identifier to be allocated by the other processor.

The transformation that the control logic subsequently performs when the real identifier has been determined by the second processor can take a number of forms. One possibility would be that the control logic pass the real identifier onto the first processor which would then modify its data or constructs to ensure that all further processing for that entity/object carried out by the first processor used the real identifier. Such an approach would however be difficult to implement and disruptive to the operation of the first processor. In preferred embodiments of the invention said control logic provides a table(s) for converting between said real identifier and said local identifier.

Another preferred feature of the invention is that said table(s) include interchange identifiers wherein a first set of said interchange identifiers are reserved for association with local identifiers of said first processor and a second set of said interchange identifiers are reserved for association with local identifiers of said second processor. This feature gives each processor the ability to determine whether a received interchange identifier corresponds to one of its own local identifiers simply by determining if it belongs to its own set of interchange identifiers. The sets of interchange identifier may have many possible forms providing they are distinct sets and it will be appreciated that in an n-processor system one would use n-sets of interchange identifiers.

Another preferred feature of the invention is that said first processor includes a buffer into which signals to be sent to said second processor are stored prior to being transmitted to said second processor, wherein said signals are transmitted when a signal is issued by said first processor requiring an answer from said second processor before said first processor may continue processing. This feature has the advantage that the signals for transmission are buffered thereby reducing the number of communication episodes whilst ensuring no time is lost because of a signal being buffered in spite of the answer to that signal being needed for processing to continue.

A corresponding complementary buffer may also be provided at said second processor. In preferred embodiments of the invention said second processor includes a buffer into which signals to be sent to said first processor are stored prior to being transmitted to said first processor, wherein said signals are transmitted when a signal is issued by said second processor requiring an answer from said first processor before said second processor may continue processing.

An embodiment of the invention will now be described, by way of example only, with reference to the accompanying drawings in which;

BRIEF DESCRIPTION OF THE DRAWING

FIG. 1 is a schematic representation of the software structure of a system which may include the invention.

FIG. 2 is a schematic representation of the real/interchange/local identifier tables which may be used.

DETAILED DESCRIPTION OF THE PREFERRED EMBODIMENT

FIG. 1 illustrates the software structure of a distributed application. Central to its operation is a message queue (MQ). Messages arrive on the message queue (MQ) as a result of user input, system operation or from other applications. The structure of the distributed application consists of a small main program (MP) resident on a host mainframe computer and a number of window procedures (WP) which may be thought of as subroutines. The purpose of the main program (MP) is to take messages from the message queue (MQ) and dispatch them to the appropriate window procedures (WP). The application controls the display to the end-user through an underlying operating system of the type such as the Presentation Manager feature of the IBM OS/2 systems (IBM, Presentation Manager and OS/2 are trademarks of International Business Machines Corporation).

Some of the window procedures (WP) are resident within and execute upon a programmable workstation (PWS). Both the host and the PWS include buffers for storing messages to be transferred between them on a communication system of known type. The control logic of the invention is embodied as a series of software instruction present in the host and PWS distributed presentation manager code (DPM).

Where a program is running in a distributed environment such as a host and PWS, one of the systems will be the master system creating the real objects (e.g. windows) and one of the systems will be the slave system which must be told the identifier of the object created, which it can then use on subsequent functions to manipulate that object. The call to create the object could be issued in either the host or PWS.

The following describes a data processing network where the slave system can be enabled to work on an object/entity before that object/entity and its real identifier have been created.

Both the master and slave system maintain a table of local/real identifiers and interchange identifiers. When a call to create an object is issued on the slave an unused POSITIVE integer (the interchange identifier) is associated with it and stored in the table. Thereafter the local identifier is used in the slave system for any following calls manipulating the new object. These calls are buffered, and then at some stage sent to the master system. The positive interchange identifier will then be added by the master system to its table, the object created and then the real object identifier associated with the interchange identifier in the table of the master.

When a call to create an object is issued on the master system then an unused NEGATIVE integer (the interchange identifier) is associated with the real local identifier obtained when the object is created. These are then stored in the table.

Whenever a call is sent between the two systems the local identifier is converted to an interchange identifier before being sent. If one of the systems receives an interchange identifier which is in the other half of the table (negative or positive) to which it normally creates things, then the object must have been created initially on the other system; an entry is added with the given interchange identifier, and when the object has been created on that system then the local identifier is associated with the interchange identifier.

In the following example, illustrated in FIG. 2, a host (slave) system has already created and used one object with the local identifier of 5. The call to create the object was passed down to the workstation (master), accompanied by the interchange identifier of 1. The workstation has then created the real object and put the objects real identifier in the table next to the interchange identifier. The object's real identifier is 100.

The host now wants to issue two new create object calls (the real objects to be created on the workstations). The host therefore creates its own local identifiers 10 and 15 for these objects, together with a control block to contain information about each object. The calls are then buffered, allowing the host to continue processing further calls, including calls which query the object identifiers. When a query is issued asking some information about the real object which the host cannot satisfy, then the calls in the buffer will be sent to the workstation. The real objects are then created on the workstation and the real identifiers allocated by the workstation. The workstation table is then updated to associate the real identifiers with the slave identifiers 10 and 15. The information which the host could not satisfy is then sent back using the interchange identifiers.

In the complementary case where the workstation issues a call to create an object in the host, the control logic in the workstation provides a local identifier for the object and associates this with a negative interchange identifier in the table. In due course the call and the negative interchange identifier will be sent to the host where the real object will be created and the real identifier real object will be created and the real identifier allocated. The table in the host will then be updated to associate the real identifier with the negative interchange identifier.

Using the invention the slave can create local shadow copies of objects and then manipulate them before the master system has actually created them.

We claim:

1. A data processing network having a first processor, a second processor and a communication system linking said first processor and said second processor characterised in that when said first processor issues a call for triggering said second processor to allocate a real identifier for an entity, control logic associated with said first processor and responsive to said call from said first processor allocates a local identifier available for immediate use by said first processor and subsequently transforms between said local identifier and said real identifier.

2. A data processing network as claimed in claim 1, wherein when said second processor issues a call for triggering said first processor to allocate a real identifier for an entity, control logic associated with said second processor and responsive to said call from said second processor allocates a local identifier available for immediate use by said second processor and subsequently transforms between said local identifier and said real identifier.

3. A data processing network as claimed in claim 2 wherein said control logic provides a table(s) for converting between said real identifier and said local identifier.

4. A data processing network as claimed in claim 3 wherein said table(s) include interchange identifiers wherein a first set of said interchange identifiers are reserved for association with local identifiers of said first processor and a second set of said interchange identifiers are reserved for association with local identifiers of said second processor.

5. A data processing network as claimed in claim 4, wherein said first processor includes a buffer into which signals to be sent to said second processor are stored prior to being transmitted to said second processor, wherein said signals are transmitted when a signal is issued by said first processor requiring an answer from said second processor before said first processor may continue processing.

6. A data processing network as claimed in claim 5 wherein said second processor includes a buffer into which signals to be sent to said first processor are stored prior to being transmitted to said first processor, wherein said signals are transmitted when a signal is issued by said second processor requiring an answer from said first processor before said second processor may continue processing.

7. A data processing network as claimed in claim 4 wherein said second processor includes a buffer into which signals to be sent to said first processor are stored prior to being transmitted to said first processor, wherein said signals are transmitted when a signal is issued by said second processor requiring an answer from said first processor before said second processor may continue processing.

8. A data processing network as claimed in claim 3, wherein said first processor includes a buffer into which signals to be sent to said second processor are stored prior to being transmitted to said second processor, wherein said signals are transmitted when a signal is issued by said first processor requiring an answer from said second processor before said first processor may continue processing.

9. A data processing network as claimed in claim 8 wherein said second processor includes a buffer into which signals to be sent to said first processor are stored prior to being transmitted to said first processor, wherein said signals are transmitted when a signal is issued by said second processor requiring an answer from said first processor before said second processor may continue processing.

10. A data processing network as claimed in claim 3 wherein said second processor includes a buffer into which signals to be sent to said first processor are stored prior to being transmitted to said first processor, wherein said signals are transmitted when a signal is issued by said second processor requiring an answer from said first processor before said second processor may continue processing.

11. A data processing network as claimed in claim 2, wherein said first processor includes a buffer into which signals to be sent to said second processor are stored prior to being transmitted to said second processor, wherein said signals are transmitted when a signal is issued by said first processor requiring an answer from said second processor before said first processor may continue processing.

12. A data processing network as claimed in claim 11 wherein said second processor includes a buffer into which signals to be sent to said first processor are stored prior to being transmitted to said first processor, wherein said signals are transmitted when a signal is issued by said second processor requiring an answer from said first processor before said second processor may continue processing.

13. A data processing network as claimed in claim 1 wherein said control logic provides a table(s) for converting between said real identifier and said local identifier.

14. A data processing network as claimed in claim 13, wherein said first processor includes a buffer into which signals to be sent to said second processor are stored prior to being transmitted to said second processor, wherein said signals are transmitted when a signal is issued by said first processor requiring an answer from said second processor before said first processor may continue processing.

15. A data processing network as claimed in claim 1, wherein said first processor includes a buffer into which signals to be sent to said second processor are stored prior to being transmitted to said second processor, wherein said signals are transmitted when a signal is issued by said first processor requiring an answer from said second processor before said first processor may continue processing.

* * * * *